(12) United States Patent
Savu et al.

(10) Patent No.: US 8,176,981 B2
(45) Date of Patent: May 15, 2012

(54) FLUORINATED SURFACTANTS AND METHODS OF USING THE SAME

(75) Inventors: Patricia M. Savu, Maplewood, MN (US); Michael J. Sierakowski, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 266 days.

(21) Appl. No.: 12/523,361

(22) PCT Filed: Jan. 18, 2008

(86) PCT No.: PCT/US2008/051409
§ 371 (c)(1),
(2), (4) Date: Jul. 16, 2009

(87) PCT Pub. No.: WO2008/089391
PCT Pub. Date: Jul. 24, 2008

(65) Prior Publication Data
US 2010/0044050 A1    Feb. 25, 2010

Related U.S. Application Data

(60) Provisional application No. 61/007,894, filed on Jan. 19, 2007.

(51) Int. Cl.
E21B 21/00 (2006.01)
E21B 37/00 (2006.01)
E21B 43/22 (2006.01)
E21B 43/26 (2006.01)
C09K 8/34 (2006.01)
C09K 8/584 (2006.01)
C09K 8/64 (2006.01)
C09K 8/70 (2006.01)

(52) U.S. Cl. .......... 166/270.2; 166/278; 166/280.1; 166/308.4; 166/308.6; 166/312; 175/65; 175/69; 507/102; 507/105; 507/202; 507/205; 507/256; 507/904; 507/910; 507/922

(58) Field of Classification Search .......... 166/270.2, 166/275, 278, 280.1, 293, 308.4, 308.6, 312; 175/65, 69; 507/102, 105, 202, 205, 244, 507/247, 256, 904, 910, 922
See application file for complete search history.

(56) References Cited

U.S. PATENT DOCUMENTS

| | | | |
|---|---|---|---|
| 2,732,398 A | 1/1956 | Brice et al. | |
| 2,803,615 A | 8/1957 | Ahlbrecht et al. | |
| 2,841,573 A | 7/1958 | Ahlbrecht et al. | |
| 3,463,231 A | 8/1969 | Hutchinson et al. | |
| 3,728,151 A | 4/1973 | Sherman et al. | |
| 3,787,351 A | 1/1974 | Olson | |
| 3,819,519 A | 6/1974 | Sharman et al. | |
| 4,432,882 A | 2/1984 | Raynolds et al. | |
| 4,440,653 A | 4/1984 | Briscoe et al. | |
| 4,557,837 A | 12/1985 | Clark, III et al. | |
| 4,622,155 A | 11/1986 | Harris et al. | |
| 5,688,884 A | 11/1997 | Baker et al. | |
| 5,804,625 A * | 9/1998 | Temperante et al. | 524/188 |
| 5,834,406 A | 11/1998 | Sydansk | |
| 5,846,915 A | 12/1998 | Smith et al. | |
| 6,037,429 A | 3/2000 | Linert et al. | |
| 6,105,672 A | 8/2000 | Deruyter et al. | |
| 6,227,296 B1 | 5/2001 | Reppert et al. | |
| 6,248,699 B1 * | 6/2001 | Subramanian et al. | 507/265 |
| 6,664,354 B2 | 12/2003 | Savu et al. | |
| 6,689,854 B2 | 2/2004 | Fan et al. | |
| 6,852,781 B2 * | 2/2005 | Savu et al. | 524/168 |
| 7,033,975 B2 | 4/2006 | Baran, Jr. et al. | |
| 7,041,727 B2 | 5/2006 | Kubicek et al. | |
| 7,049,379 B2 | 5/2006 | Jariwala et al. | |
| 7,066,262 B2 | 6/2006 | Funkhouser | |
| 7,124,822 B2 | 10/2006 | Chatterji et al. | |
| 7,166,329 B2 | 1/2007 | Dams | |
| 7,199,197 B2 | 4/2007 | Caldwell et al. | |
| 7,417,099 B2 | 8/2008 | Savu et al. | |
| 7,585,817 B2 | 9/2009 | Pope et al. | |
| 7,662,896 B2 | 2/2010 | Savu et al. | |
| 7,772,162 B2 | 8/2010 | Pope et al. | |

(Continued)

FOREIGN PATENT DOCUMENTS

| | | |
|---|---|---|
| EP | 0 624 710 | 11/1994 |
| EP | 1 311 637 | 4/2006 |
| WO | 2006/001322 | 1/2006 |
| WO | 2006/038493 | 4/2006 |

OTHER PUBLICATIONS

Alm, R. R., et al., "Foaming of Organic Liquids with Fluorochemical Surfactants," *Chemical Times & Trends*, (1986) p. 40-48.
Clark, H. B., et al., "Use of Fluorochemical Surfactants in Nonaqueous Stimulation Fields," *Journal of Petroleum Chemistry* vol. 32, No. 10 (1980) p. 1695-1697.
Hanssen, J. E. and Haugum, R. U., "Gas Blockage by Nonaqueous Foams," Feb. 1991, SPE 21002, Proc.: 1991 SPE Int. Symp. On Oilfield Chemistry, pp. 65-78.

(Continued)

*Primary Examiner* — George Suchfield

(57) ABSTRACT

A composition comprising a nonionic fluorinated polymeric surfactant having a weight average molecular weight of least 100,000 grams per mole, the nonionic fluorinated polymeric surfactant comprising: divalent units independently represented by formula (I): in a range from 30% to 65% by weight, based on the total weight of the nonionic fluorinated polymeric surfactant; and divalent units independently represented by formula (II): in a range from 70% to 35% by weight, based on the total weight of the nonionic fluorinated polymeric surfactant. $R_f$ is a perfluoroalkyl group having from 3 to 4 carbon atoms; R and $R^2$ are each independently hydrogen or alkyl of 1 to 4 carbon atoms; $R^1$ is alkyl of 16 to 24 carbon atoms; and n is an integer from 2 to 11. Foams comprising the nonionic fluorinated polymeric surfactant and a liquid hydrocarbon and methods of making and using the foams are also disclosed.

20 Claims, No Drawings

U.S. PATENT DOCUMENTS

| | | | |
|---|---|---|---|
| 7,855,169 | B2 | 12/2010 | Pope et al. |
| 2003/0139549 | A1* | 7/2003 | Savu et al. ............... 526/243 |
| 2003/0236340 | A1* | 12/2003 | Kubicek et al. ........... 524/505 |
| 2005/0027063 | A1 | 2/2005 | Audenaert et al. |
| 2005/0106326 | A1 | 5/2005 | Audenaert et al. |
| 2005/0137266 | A1 | 6/2005 | Jing et al. |
| 2005/0142563 | A1 | 6/2005 | Haddad et al. |
| 2006/0045979 | A1 | 3/2006 | Dams |
| 2007/0225176 | A1* | 9/2007 | Pope et al. ............... 507/221 |
| 2008/0051300 | A1* | 2/2008 | Pope et al. ............... 507/226 |
| 2010/0025038 | A1 | 2/2010 | Savu et al. |
| 2010/0137169 | A1 | 6/2010 | Pope et al. |
| 2010/0276149 | A1 | 11/2010 | Pope et al. |

OTHER PUBLICATIONS

Holcomb, David L. et al., "Foamed Hydrocarbon Stimulation Water Sensitive Formations," *Society of Petroleum Engineers of AIME*, SPE 9033, (1980) p. 1-18.

Mainai, B. B. and H. Sarma, "Role of Nonpolar Foams in Production of Heavy Oils," *Foams: Fundamentals and Applications in the Petroleum Industry*, edited by L. L. Schramm, Advances in Chemistry Series 242, American Chemical Society, Washington DC (1994) p. 408-409.

Novosad, J. J., "The Interaction Between Foam and Crude Oils,"*Petroleum Society of CIM*, Paper No. 89-40-29, (1989) p. 29-1 to 29-15.

Schramm, L. L. and F. Wassmuth, "Foams: Basic Principle," *Foams: Fundamentals and Applications in the Petroleum Industry*, edited by L. L. Schramm, Advances in Chemistry Series 242, American Chemical Society, Washington DC (1994) p. 30-38.

Tyrode, Eric, et al., "Foamability and Foam Stability at High Pressures and Temperatures," *Review of Scientific Instruments*, vol. 74, No. 5, (2003) p. 2925-2932.

International Search Report, PCT/US2008/051409, dated Jun. 19, 2008.

* cited by examiner

FLUORINATED SURFACTANTS AND METHODS OF USING THE SAME

CROSS REFERENCE TO RELATED APPLICATIONS

This application is a national stage filing under 35 U.S.C. 371 of PCT/US2008/051409, filed Jan. 18, 2008, which claims priority to U.S. Provisional Application No. 61/007,894, filed Jan. 19, 2007, the disclosure of which is incorporated by reference in its entirety herein.

BACKGROUND

Fluorinated surfactants have been widely used, for example, as foaming agents and leveling agents for many years. The foaming and leveling properties of fluorinated surfactants have made them useful in many industries (e.g., oil and gas and textiles) for many applications (e.g., industrial coatings).

Foams are useful in various operations involving hydrocarbon-producing wells (e.g., oil or natural gas wells), including enhanced oil recovery, fracturing, drilling, and completion operations. Foamed fluids may have several advantages over non-foamed fluids. For example, the volume of liquid in a foamed fluid is less than in non-foamed fluids, and as a result, less fluid loss to permeable subterranean formations occurs when a foam is used. Further, foamed fluids are typically more easily removed from a geological formation following an enhanced oil recovery, fracturing, or completion operation than non-foamed fluids. Foamed fluids (including either gelled or non-gelled fluids) also tend to have a greater ability than their non-foamed counterparts to suspend and transport particulate materials (e.g., proppants, gravel, released fines, and drilling cuttings) that are used or produced in fracturing, drilling, or completion operations. Foams also have lower densities than non-foamed drilling fluids, and the use of foams typically lowers the formation damage potential when drilling in underbalanced conditions (i.e., when the pressure in the drilling fluid is lower than the pore pressure in the surrounding rock).

Liquids utilized as the liquid phase in foams employed in gas- or oilfield operations include water, hydrocarbons, and aqueous alcohol solutions. The use of one or more hydrocarbons in the liquid phase of foamed fluids for subterranean formation treatments is advantageous when the subterranean formation is sensitive to the intrusion of water foreign to the formation. Such water-sensitive formations generally contain clays that are irreparably damaged upon foreign water contact due to the swelling of the clays and/or the migration of fines as a result thereof.

In a foam, gas bubbles are separated from each other by thin liquid films. Typically, surfactants stabilize foams by adsorbing at the interface of the bubbles and the liquid films and providing a barrier to coalescence of the bubbles. It is typically more challenging to form hydrocarbon foams than to form aqueous foams. Unlike water, which has a high surface tension and can dissolve charged species, hydrocarbons generally do not have properties that prevent the coalescence of gas bubbles.

Some fluorinated surfactants are known to produce stable hydrocarbon foams. Traditionally, many of the widely available fluorinated surfactants include long-chain perfluoroalkyl groups, for example, perfluorooctanesulfonamide groups. Recently, however, there has been an industry trend away from using perfluorooctyl fluorinated surfactants, which has resulted in a need, for example, for new types of surfactants that can produce hydrocarbon foams.

One nonionic polymeric fluorinated surfactant having perfluorobutanesulfonamido-containing repeating units and a weight average molecular weight of about 15,000 grams per mole has been used as a hydrocarbon foaming agent in drilling fluids and in enhanced oil recovery fluids added to injection wells.

SUMMARY

In one aspect, the present invention provides a nonionic fluorinated polymeric surfactant having a weight average molecular weight of least 100,000 grams per mole, the nonionic fluorinated polymeric surfactant comprising:

divalent units independently represented by formula I:

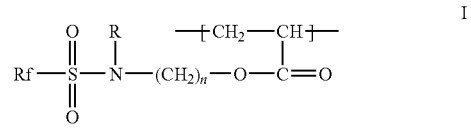

in a range from 30% to 65% by weight, based on the total weight of the nonionic fluorinated polymeric surfactant; and divalent units independently represented by formula II:

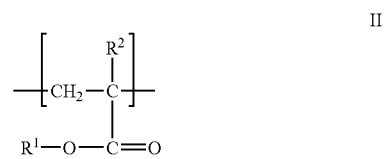

in a range from 70% to 35% by weight, based on the total weight of the nonionic fluorinated polymeric surfactant;

wherein $R_f$ is a perfluoroalkyl group having from 3 to 4 carbon atoms;

R and $R^2$ are each independently hydrogen or alkyl of 1 to 4 carbon atoms;

$R^1$ is alkyl of 16 to 24 carbon atoms; and n is an integer from 2 to 11.

In some embodiments, the present invention provides a composition comprising a nonionic fluorinated polymeric surfactant according to the present invention and a liquid hydrocarbon (e.g., at least one of kerosene, diesel, gasoline, pentane, hexane, heptane, mineral oil, or a naphthene). In some embodiments, the composition is a foam.

In another aspect, the present invention provides a method of making a foam comprising a liquid hydrocarbon, the method comprising:

providing a composition comprising a liquid hydrocarbon and a nonionic fluorinated polymeric surfactant having a weight average molecular weight of least 100,000 grams per mole, the nonionic fluorinated polymeric surfactant comprising:

divalent units independently represented by formula I:

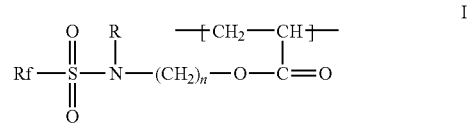

in a range from 30% to 65% by weight, based on the total weight of the nonionic fluorinated polymeric surfactant; and divalent units independently represented by formula II:

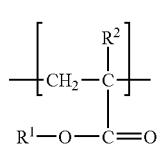

in a range from 70% to 35% by weight, based on the total weight of the nonionic fluorinated polymeric surfactant; wherein
  $R_f$ is a perfluoroalkyl group having from 3 to 4 carbon atoms;
  R and $R^2$ are each independently hydrogen or alkyl of 1 to 4 carbon atoms;
  $R^1$ is alkyl of 16 to 24 carbon atoms; and
  n is an integer from 2 to 11; and
forming gas bubbles in the composition to make the foam.

In another aspect, the present invention provides a method of treating a subterranean geological formation bearing hydrocarbons, the method comprising introducing a foam into the subterranean geological formation bearing hydrocarbons, wherein the foam comprises a liquid hydrocarbon and a nonionic fluorinated polymeric surfactant according to the present invention. In some embodiments, introducing the foam comprises injecting the foam into the subterranean geological formation bearing hydrocarbons at a rate and a pressure sufficient to open at least one fracture therein. In some embodiments, the formation has at least one injection well and at least one production well, and introducing the foam into the subterranean geological formation bearing hydrocarbons comprises injecting the foam through the injection well, the method further comprising causing the foam to mobilize at least a portion of the hydrocarbons in the subterranean geological formation. In some of these embodiments, the method further comprises recovering at least a portion of the hydrocarbons from the production well.

In some embodiments of the method of treating a subterranean geological formation according to the present invention, the method further comprises drilling a well in the subterranean geological formation bearing hydrocarbons using a drilling rig; and transporting drilling cuttings via the foam. In some embodiments the subterranean geological formation is penetrated by a well bore, the foam is introduced into the well bore of subterranean geological formation, and the method further comprises carrying out a completion operation in the well bore of the subterranean geological formation. In some embodiments, the completion operation is at least one of gravel packing the well bore, cleaning the well bore, or cementing the well bore.

In some embodiments of methods according to the present invention, the liquid hydrocarbon is at least one of kerosene, diesel, gasoline, pentane, hexane, heptane, mineral oil, or a naphthene.

Nonionic fluorinated polymeric surfactants according to the present invention typically produce stable hydrocarbon foams (i.e., foams that have a long half-life). In some embodiments of the foregoing aspects, a one weight percent solution of the nonionic fluorinated polymeric surfactant in kerosene has a foam half-life at 22° C. of at least 20, 25, 30, 35, 40, or even at least 45 minutes. Nonionic fluorinated polymeric surfactants according to the present invention provide hydrocarbon foams that are typically, and surprisingly, more stable than a nonionic polymeric surfactant containing perfluorobutanesulfonamido groups used previously in drilling fluids and in enhanced oil recovery operations. In some embodiments, nonionic fluorinated polymeric surfactants according to the present invention provide hydrocarbon foams that are more stable than foams comprising analogous nonionic fluorinated polymeric surfactants containing perfluorooctanesulfonamide groups.

In this application:

"Alkyl group" and the prefix "alk-" are inclusive of both straight chain and branched chain groups and of cyclic groups. Cyclic groups can be monocyclic or polycyclic and, in some embodiments, have from 3 to 10 ring carbon atoms.

The term "perfluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of perfluoroalkyl groups, when at least one hydrogen or chlorine is present, the perfluoroalkyl group includes at least one trifluoromethyl group.

The term "hydrocarbon" refers to compounds consisting of carbon and hydrogen and includes linear, branched, and cyclic groups which may be saturated or unsaturated.

The term "nonionic" refers to being free of ionic groups (e.g., salts) or groups (e.g., —CO$_2$H, —SO$_3$H, —OSO$_3$H, —P(=O)(OH)$_2$) that are readily ionized in water.

The term "foam" refers to a mixture of gas (e.g., nitrogen, carbon dioxide, air, and natural gas) and liquid, which in this application comprises a liquid hydrocarbon.

All numerical ranges are inclusive of their endpoints unless otherwise stated.

DETAILED DESCRIPTION

Nonionic fluorinated polymeric surfactants according to the present invention have a weight average molecular weight of at least 100,000 (in some embodiments, at least 105,000, 110,000, 115,000, 120,000, 125,000, 130,000, 135,000, or even at least 140,000) grams per mole. In some embodiments, the nonionic fluorinated polymeric surfactants have a weight average molecular weight of up to 250,000 (in some embodiments, up to 245,000, 240,000, 235,000, 230,000, 225,000, 220,000, 215,000, 210,000, 205,000, 200,000, 195,000, 190,000, 185,000, 180,000, 175,000, 170,000, 165,000, or even up to 160,000) grams per mole. The nonionic fluorinated polymeric surfactants typically have a distribution of molecular weights and compositions. Weight average molecular weights can be measured, for example, by gel permeation chromatography (i.e., size exclusion chromatography) using techniques known in the art.

Nonionic fluorinated polymeric surfactants according to the present invention comprise divalent units independently represented by formula I:

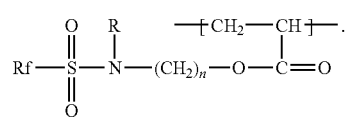

Rf is a perfluoroalkyl group having from 3 to 4 carbon atoms (e.g., perfluoro-n-butyl, perfluoroisobutyl, perfluoro-sec-butyl, perfluoro-tert-butyl, perfluoro-n-propyl, or perfluoroisopropyl). In some embodiments, Rf is perfluorobutyl (e.g., perfluoro-n-butyl). In some embodiments, Rf is perfluoropropyl (e.g., perfluoro-n-propyl).

R is hydrogen or alkyl of 1 to 4 carbon atoms (e.g., methyl, ethyl, n-propyl, isopropyl, n-butyl, isobutyl, or sec-butyl). In some embodiments, R is methyl or ethyl.

In formula I, n is an integer having a value from 2 to 11 (i.e., 2, 3, 4, 5, 6, 7, 8, 9, 10, or 11).

The divalent units independently represented by formula I are present in a range from 30 to 65 (in some embodiments, from 35 to 60 or even from 45 to 55) weight percent, based on the total weight of the nonionic fluorinated polymeric surfactant.

Nonionic fluorinated polymeric surfactants according to the present invention comprise divalent units independently represented by formula II:

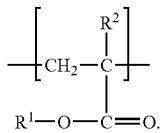

$R^2$ is hydrogen or alkyl of 1 to 4 carbon atoms (e.g., methyl, ethyl, n-propyl, isopropyl, n-butyl, isobutyl, or sec-butyl). In some embodiments, $R^2$ is hydrogen. In some embodiments, $R^2$ is methyl.

$R^1$ is alkyl of 16 to 24 (in some embodiments, 18 to 22) carbon atoms.

The divalent units independently represented by formula II are present in a range from 35 to 70 (in some embodiments, from 40 to 65 or even from 45 to 55) weight percent, based on the total weight of the nonionic fluorinated polymeric surfactant.

In some embodiments of nonionic fluorinated polymeric surfactants according to the present invention, the divalent groups independently represented by formula I and the divalent groups independently represented by formula II are randomly copolymerized.

Nonionic fluorinated polymeric surfactants according to the present invention may be prepared, for example, by copolymerizing a mixture containing at least first and second monomers typically in the presence of a chain transfer agent and an initiator. By the term "copolymerizing" it is meant forming a polymer or oligomer that includes at least one identifiable structural element due to each of the first and second monomers. Typically the polymer or oligomer that is formed has a distribution of molecular weights and compositions.

The first monomer is at least one of a fluorinated free-radically polymerizable acrylate monomer represented by formula III:

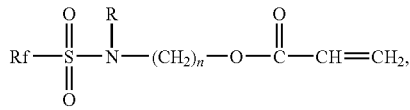

wherein Rf, R, and n are as defined above for formula I.

The second monomer is at least one of an aliphatic free-radically polymerizable monomer represented by formula IV:

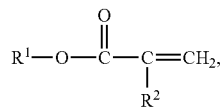

wherein $R^1$ and $R^2$ are as defined above for formula II.

Fluorinated free-radically polymerizable acrylate monomers of formula III, and methods for their preparation, are known in the art; (see, e.g., U.S. Pat. Nos. 2,803,615 (Albrecht et al.) and 6,664,354 (Savu et al.), the disclosures of which, relating to free-radically polymerizable monomers and methods of their preparation, are incorporated herein by reference). Methods for making nonafluorobutanesulfonamido group-containing structures, described in the above references, can be used to make heptafluoropropanesulfonamido groups by starting with heptafluoropropanesulfonyl fluoride, which can be made, for example, by the methods described in Examples 2 and 3 of U.S. Pat. No. 2,732,398 (Brice et al.), the disclosure of which is incorporated herein by reference.

Compounds of formula IV (e.g., hexadecyl methacrylate, octadecyl methacrylate, stearyl acrylate, behenyl methacrylate) are available, for example, from several chemical suppliers (e.g., Sigma-Aldrich Company, Milwaukee, Wis.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula IV are available as single isomers (e.g., straight-chain isomer) of single compounds. Other compounds of formula IV are available, for example, as mixtures of isomers (e.g., straight-chain and branched isomers), mixtures of compounds (e.g., hexadecyl acrylate and octadecylacrylate), and combinations thereof.

In some embodiments, mixtures of more than one first monomer and/or more than one second monomer (e.g., stearyl methacrylate and behenyl methacrylate) can be used. In other embodiments, one first monomer and one second monomer can be used.

Polymerization of at least one first monomer and at least one second monomer is typically carried out in the presence of an added free-radical initiator. Free radical initiators such as those widely known and used in the art may be used to initiate polymerization of the components. Examples of free-radical initiators include azo compounds (e.g., 2,2'-azobisisobutyronitrile (AIBN), 2,2'-azobis(2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), diacylperoxides (e.g., benzoyl peroxide or lauryl peroxide). Useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); and acylphosphine oxide derivatives and amylphosphonate derivatives (e.g., diphenyl-2,4,6-trimethylbenzoylphosphine oxide, isopropoxyphenyl-2,4,6-trimethylbenzoylphosphine oxide, or dimethyl pivaloylphosphonate). When heated or photolyzed such free-radical initiators fragment to generate free radicals which add to ethylenically unsaturated bonds and initiate polymerization.

Polymerization reactions may be carried out in any solvent suitable for organic free-radical polymerizations. The components may be present in the solvent at any suitable concentration, (e.g., from about 5 percent to about 90 percent by weight based on the total weight of the reaction mixture). Illustrative examples of suitable solvents include aliphatic and alicyclic hydrocarbons (e.g., hexane, heptane, and cyclohexane), aromatic solvents (e.g., benzene, toluene, and xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), sulfoxides (e.g., dimethyl sulfoxide), amides (e.g., N,N-dimethylformamide and N,N-dimethylacetamide), halogenated solvents (e.g., methylchloroform, 1,1,2-trichloro-1,2,2-trifluoroethane, trichloroethylene, and trifluorotoluene), and mixtures thereof. In some embodiments, nonionic fluorinated polymeric surfactants according to the present invention are prepared by a polymerization reaction carried out in at least one ester solvent (e.g., ethyl acetate and butyl acetate).

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or even from about 50° C. to about 80° C.).

Free-radical polymerizations may be carried out in the presence of chain transfer agents. Typical chain transfer agents that may be used in the preparation of nonionic fluorinated polymeric surfactants according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan and dodecylmercaptan).

Adjusting, for example, the concentration and activity of the initiator, the concentration of each monomer, the temperature, the concentration of the chain transfer agent, and the solvent using techniques known in the art can control the molecular weight of a polyacrylate copolymer.

In some embodiments, compositions according to the present invention comprise a liquid hydrocarbon. Suitable liquid hydrocarbons include crude oil; refined hydrocarbons (e.g., gasoline, kerosene, and diesel); paraffinic and isoparaffinic hydrocarbons (e.g., pentanes, hexanes, heptanes, higher alkanes, and isoparaffinic solvents obtained from Total Fina, Paris, France, under trade designations "ISANE IP 130" and "ISANE IP 175" and from Exxon Mobil Chemicals, Houston, Tex., under the trade designation "ISOPAR"); mineral oil; ligroin; naphthenes; aromatics (e.g., xylenes and toluene); natural gas condensates; and combinations (either miscible or immiscible) thereof. In some embodiments, compositions according to the present invention comprise kerosene. In some embodiments, compositions according to the present invention comprise diesel.

In some embodiments, compositions according to the present invention are foams. The stability (i.e., foam half-life) and other properties (e.g., foam expansion) of foams according to the present invention can be measured using techniques known in the art; (see, e.g., Alm, R. R. et al., Chemical Times & Trends, April, 1986, pp. 40-48). In this application, the foam half-life is determined by placing about 200 mL of a one weight percent solution of the nonionic fluorinated polymeric surfactant in kerosene in the bowl of a food mixer obtained from Hobart, Troy, Ohio (model N-50) and mixing the solution at 22° C. for three minutes at medium speed (300 rpm) using the wire whisk attachment. The resulting foam is then immediately poured into a 2000-mL graduated cylinder made of "NALGENE" high density polypropylene and having a internal diameter of about 8 centimeters and a height of about 52 centimeters (obtained from VWR International) to measure the foam expansion and foam half-life. The time necessary for half of the liquid to be drained from the foam (i.e., to provide half of the initial volume of liquid) is measured to provide the foam half-life. Foam expansion refers to the volume achieved after foaming divided by the volume of the liquid before foaming. The foam index is calculated by multiplying the foam expansion by the foam half-life.

In some embodiments, nonionic fluorinated polymeric surfactants according to the present invention provide surprisingly longer-lived foams than nonionic polymeric surfactants comprising other fluorinated divalent units (e.g., fluorinated divalent units represented by formula V:

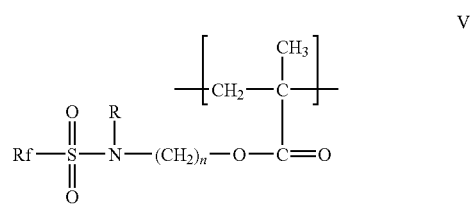

wherein Rf, R, and n are as defined above for divalent units of formula I). Typically, and surprisingly, nonionic fluorinated polymeric surfactants according to the present invention have been observed to provide longer-lived foams than nonionic fluorinated polymeric surfactants having lower molecular weights. In some embodiments, nonionic fluorinated polymeric surfactants according to the present invention provide surprisingly longer-lived foams than nonionic polymeric surfactants comprising divalent units independently represented by formula II wherein $R^1$ is alkyl of less than 14 carbon atoms.

Typically, compositions (e.g., foams) according to the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of at least one nonionic fluorinated polymeric surfactant according to the present invention, based on the total weight of the composition. For example, the amount of the nonionic fluorinated polymeric surfactant in foams may be in a range of from 0.01 to 10, 0.1 to 10, 0.1 to 5, 1 to 10, or even in a range from 1 to 5 percent by weight, based on the total weight of the composition. In some embodiments, the nonionic fluorinated polymeric surfactant is present in a range from 0.3 to 0.5 percent by weight, based on the total weight of the composition. Lower and higher amounts of the nonionic fluorinated polymeric surfactant in the compositions (e.g., foams) may also be used, and may be desirable for some applications.

Forming gas bubbles (e.g., nitrogen, carbon dioxide, and air) in a composition comprising a liquid hydrocarbon and a nonionic fluorinated polymeric surfactant according to the present invention can be carried out using a variety of mechanisms (e.g., mechanical and chemical mechanisms). Useful mechanical foaming mechanisms include agitating (e.g., shaking, stirring, and whipping) the composition, injecting gas into the composition (e.g., inserting a nozzle beneath the surface of the composition and blowing gas into the composition) and combinations thereof. Useful chemical foaming mechanisms include producing gas in situ through a chemical reaction, decomposition of a component of the composition (e.g., a component that liberates gas upon thermal decomposition), evaporating a component of the composition (e.g., a liquid gas, and volatilizing a gas in the composition by decreasing the pressure on the composition or heating the composition). Foams according to and/or prepared by methods according to the present invention comprise gas bubbles at volume fractions ranging from 10% to 90% of the total foam volume.

Mixing gas bubbles in liquid hydrocarbons to form foams, for example, at a well site (or even at the well head) can be carried out using one of several methods known in the art. Such methods include those described in U.S. Pat. Nos. 3,463,231 (Hutchison et al.) and 3,819,519 (Sharman et al.), the disclosures of which, relating to methods of generating foams, are incorporated herein by reference.

Techniques for treating subterranean geological formations comprising hydrocarbons in order to open at least one fracture therein are known in the art. Such fracturing is usually accomplished by injecting a fluid (e.g., a foam) at a high rate and pressure that exceeds the rock strength and opens highly conductive fractures or channels in the hydrocarbon-producing geological formation around the well. Methods according to the present invention may be used to enhance extraction of hydrocarbons (e.g., oil and gas) from naturally occurring or man-made reservoirs. Liquid hydrocarbons suitable for use as fracturing fluids can be obtained from SynOil, Calgary, Alberta, Canada under the trade designations "PLATINUM", "TG-740", "SF-770", "SF-800", "SF-830", and "SF-840".

In some embodiments, methods of treating a subterranean geological formation comprising hydrocarbons according to the present invention further comprise injecting a plurality of proppant particles into the fracture formed by injecting a foam into the formation at a rate and pressure sufficient to open at least one fracture therein. Proppant particles so injected prevent the formed fractures from closing, thereby maintaining conductive channels through which hydrocarbons in the formation can flow. Techniques for injecting proppant particles into fractured subterranean geological formations are known in the art. In some embodiments, injecting the plurality of proppant particles and injecting the foam are carried out simultaneously, for example, by combining the proppant particles and the foam prior to injection into the formation. In some embodiments, foam compositions according to the present invention further comprise a plurality of proppant particles. In some embodiments, injecting the plurality of proppant particles is carried out after injecting the foam.

Methods of using foams for enhanced oil recovery are known in the art. Foams according to the present invention can be used to displace or push hydrocarbons from a formation. The foams may also be used to block more permeable areas of the formation allowing an injected gas or fluid to be redirected to less permeable area of the formation where hydrocarbon is trapped. Foams can be formed by formation gases downhole by introducing a composition comprising a nonionic fluorinated polymeric surfactant according to the present invention and a liquid hydrocarbon into a subterranean geological formation, thereby reducing the mobility of gases in the formation. Other methods of enhanced oil recovery are described in U.S. Pat. Nos. 6,105,672 (Deruyter et al.), 6,227,296 (Reppert et al.), and 5,834,406 (Sydansk), the disclosures of which are incorporated herein by reference.

Various operations (e.g., cleaning the well bore, gravel packing the well bore, and cementing the well bore), often referred to as completion operations, are used to prepare a hydrocarbon-producing well for production. Techniques for introducing a foam into the well bore of the subterranean geological formation to carry out a completion operation are known in the art (see, e.g., U.S. Pat. No. 7,066,262 (Funkhouser), the disclosure of which is incorporated herein by reference). In some embodiments, foams according to the present invention further comprise a plurality of gravel particles. Foams containing suspended gravel particles can be used to deliver the gravel particles to a desired area in a well bore (e.g., near unconsolidated or weakly consolidated formation sand) to form a gravel pack to enhance sand control.

Techniques for using a foam in drilling a subterranean well in a subterranean geological formation comprising hydrocarbons are known in the art (see, e.g., U.S. Pat. No. 7,033,975 (Baran et al.), the disclosure of which is incorporated herein by reference). Foams according to the present invention can be made, for example, at the well head from a surfactant solution and a gas supply using commercial mixing equipment, pumped down the well bore to the region where drilling is being carried out, usually down the middle of the drill string and out into the generally annular space between drill string and well bore wall around the drilling head to envelop drilling cuttings and transport them up the annular space to the well head. The cuttings can then be separated from the foam for disposal. Under most well drilling applications in permeable formations, the drilling fluid pressure should be kept between the pore pressure of the well and the fracturing pressure of the surrounding well formation. If the fluid pressure is too low, the formation fluid can force the fluid from the well bore or annulus resulting in a kick or blowout. If the fluid pressure is too high the formation adjacent the well bore may fracture resulting in loss of fluid circulation and loss of fluid and cuttings to the fracture. Liquid hydrocarbon drilling fluids can be obtained from SynOil under the trade designation "SYN-DRIL" and from Baker Hughes, Houston, Tex., under the trade designations "CARBO-DRILL" and "CARBO-CORE".

For methods according to the present invention, the terms "well" and "well bore" include a producing well, a non-producing well, an injection well, a fluid disposal well, an experimental well, and an exploratory well. Wells and well bores may be vertical, horizontal, deviated some angle between vertical and horizontal, and combinations thereof (e.g., a vertical well with a non-vertical component). The term "introducing" includes pumping, injecting, pouring, releasing, displacing, spotting, circulating, or otherwise placing a foam within a well, well bore, or subterranean geological formation using any suitable manner known in the art.

A variety of pumping systems (e.g., positive displacement and centrifugal pumps) employing a variety of drivers (e.g., motors, turbines, and generators) may be used in practicing methods according to the present invention.

Suitable proppant and gravel particles useful in practicing the present invention include graded walnut shells, other graded nut shells, resin-coated walnut shells, other resin-coated nut shells, graded sand, resin-coated sand, sintered bauxite, particulate ceramic materials, glass beads, and particulate thermoplastic materials. Sand particles are available, for example, from Badger Mining Corp., Berlin, Wis.; Borden Chemical, Columbus, Ohio; Fairmont Minerals, Chardon, Ohio. Thermoplastic particles are available, for example, from the Dow Chemical Company, Midland, Mich.; and BJ Services, Houston, Tex. Clay-based particles are available, for example, from CarboCeramics, Irving, Tex.; and Saint-Gobain, Courbevoie, France. Sintered bauxite ceramic particles are available, for example, from Borovichi Refractories, Borovichi, Russia; 3M Company, St. Paul, Minn.; CarboCeramics; and Saint Gobain. Glass beads are available, for example, from Diversified Industries, Sidney, British Columbia, Canada; and 3M Company. The size of the particles employed may depend, for example, on the characteristics of the subterranean formation. Generally, the sizes of suitable particulates may vary in the range of from about 2 to about 200 mesh (U.S. Sieve Series scale).

In some embodiments, foams according to and/or prepared according to the present invention further comprise a gelling agent (e.g., a phosphoric acid ester). In some of these embodiments, the foams further comprise an activator (e.g., a source of polyvalent metal ions) for the gelling agent. Typically, in embodiments where gelling agents are used, liquid hydrocarbons useful in practicing the present invention are combined with a gelling agent (e.g., a phosphoric acid ester), an activator (e.g., ferric sulfate, ferric chloride, aluminum chloride, sodium aluminate, or aluminum isopropoxide), and a nonionic polymeric surfactant, and the resulting mixture is converted to a foam, which is injected into the subterranean geological formation. Gelling agents and activators useful in practicing the present invention are described, for example, in U.S. Pat. Nos. 4,622,155 (Harris et al.) and 5,846,915 (Smith et al.), the disclosures of which are incorporated herein by reference. In some embodiments wherein gelling agents are used, a suitable breaker may be included in or added to the foam so that the viscosity of the treatment foam may eventually be reduced, for example, to recover it from the subterranean formation at a desired time. Suitable breakers include, for example, those described in U.S. Pat. No. 7,066,262 (Funkhouser), the disclosure of which is incorporated herein by reference.

Nonionic fluorinated polymeric surfactants according to the present invention may also be useful, for example, in foams for delivering oil- and/or water-repellent treatments to substrates (including fibrous substrates, e.g., textile, non-woven, carpet, and leather). The nonionic fluorinated polymeric surfactant can also be applied as an oil- and/or water-repellent treatment using other conventional application methods. Methods for treating substrates with fluorinated polymers as well as solvents and additives useful in formulations of oil- and/or water-repellent treatments are known in the art (see, e.g., U.S. Pat. App. Pub. No. 2005/0027063 (Audenaert et al.), the disclosure of which is incorporated herein by reference. Useful amounts of nonionic fluorinated polymeric surfactants according to the present invention that can provide repellency to a substrate typically range from 0.01% to 10% (in some embodiments, 0.05% to 3.0% or even 0.1 to 1.0%) by weight, based on the weight of the substrate.

Nonionic fluorinated polymeric surfactants according to the present invention may also be useful, for example, as industrial coating additives to provide better wetting and/or leveling of a coating to a substrate surface or better dispersability of a component (e.g., a thickening agent or pigment) within the coating formulation. Industrial coating formulations typically include at least one polymeric material (e.g., a film-forming polymer) and at least one solvent (e.g., methyl ethyl ketone and 1-methoxy-2-propanol). When a coating formulation is applied to a substrate, solvent evaporates, and the polymer particles coalesce to form a continuous film. Coating formulations are typically applied, dried, and optionally heated, leaving the finished product with a solid coating. The addition of fluorinated surfactants according to the present invention may improve the film forming properties of some formulations by improving the ability of the coating to wet the substrate and/or by allowing for even evaporation of solvent (i.e., leveling) during film formation.

Examples of suitable film-forming polymers for coating formulations include acrylic polymers (e.g., poly(methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins, (e.g., polystyrene); copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic derivatives including cellulose ethers and cellulose esters, (e.g., ethyl cellulose and cellulose acetate/butyrate), and urethane-acrylate copolymers. Such polymers are available, for example, from commercial sources or may be prepared using methods and starting materials known in the art.

Depending on the application, coating formulations may also include at least one additive (e.g., biocides, fillers, additional leveling agents, emulsifiers, defoamers, anticorrosive agents, dispersants, and rust inhibitors). The formulation may also optionally contain at least one pigment.

Coating formulations that may be improved by the addition of fluorinated surfactants according to the present invention include floor polishes and finishes, varnishes for a variety of substrates (e.g., wood floors), gels applied in the manufacture of photographic film, automotive or marine coatings (e.g., primers, base coats, and topcoats), sealers for porous substrates (e.g., wood, concrete, and natural stone), hard coats for plastic lenses, coatings for metallic substrates (e.g., cans, coils, electronic components, and signage), inks (e.g, for pens and gravure, screen, and thermal printing), and coatings used in the manufacture of electronic devices (e.g., photoresist inks). The formulations may be clear or pigmented. Coating formulations may be applied by many methods known to one of skill in the art (e.g., brushing, mopping, bar coating, spraying, dip coating, gravure coating, or roll coating).

When used in formulations for industrial coatings, nonionic fluorinated polymeric surfactants according to the present invention can be formulated into a solution or dispersion at a final concentration, for example, of about 0.001 to about 1 (in some embodiments about 0.001 to about 0.5, or even about 0.01 to about 0.3) weight percent, based on the weight of the solution or dispersion.

Embodiments and advantages of this invention are further illustrated by the following non-limiting examples, but the particular materials and amounts thereof recited in these examples, as well as other conditions and details should not be construed to unduly limit this invention.

Unless otherwise noted, all parts, percentages, ratios, etc. in the examples and the rest of the specification are by weight.

EXAMPLES

Weight Average Molecular Weight Determination

The weight average molecular weights of Examples 2 and Illustrative Examples 12 and 13 were determined by comparison to linear polystyrene polymer standards using gel permeation chromatography (GPC). The GPC measurements were carried out on a Waters Alliance 2695 system (obtained from Waters Corporation, Milford, Mass.) using four 300 millimeter (mm) by 7.8 mm linear columns of 5 micrometer styrene divinylbenzene copolymer particles (available from Polymer Laboratories, Shropshire, UK, under the trade designation "PLGEL") with pore sizes of 10,000, 1000, 500, and 100 angstroms. A refractive index detector from Waters Corporation (model 410) was used at 40° C. A 50-milligram (mg) sample of oligomer at 40% solids in ethyl acetate was diluted with 10 milliliters (mL) of tetrahydrofuran (inhibited with 250 ppm of BHT) and filtered through a 0.45 micrometer syringe filter. A sample volume of 100 microliters was injected onto the column, and the column temperature was 40° C. A flow rate of 1 mL/minute was used, and the mobile phase was tetrahydrofuran. Molecular weight calibration was performed using narrow dispersity polystyrene standards with peak average molecular weights ranging from $3.8 \times 10^5$ grams per mole to 580 grams per mole. Calibration and molecular weight distribution calculations were performed using suitable GPC software using a third order polynomial fit for the molecular weight calibration curve. Each reported result is an average of duplicate injections.

Example 1

Under a flow of nitrogen, 50 g of N-methylperfluorobutanesulfonamidoethyl acrylate (MeFBSEA), 50 g of octadecyl methacrylate (obtained from TCI, Tokyo, Japan, at 95% purity), 0.2 g of thioglycerol (obtained from Sigma-Aldrich, Milwaukee, Wis.), and 143 g of ethyl acetate were added to a 1-L flask equipped with an overhead stirrer, a thermocouple, and a reflux condenser. After the additions, the contents of the flask were kept under slightly positive nitrogen pressure. The temperature set point was raised to 65° C. using a J-Kem temperature controller (obtained from VWR International, West Chester, Pa.), and 2.0 g of a 50/50 mixture of mineral spirits/tert-butyl peroxy-2-ethylhexanoate (obtained from Atofina, Philadelphia, Pa., under the trade designation "LUPEROX 26M50") was added. The reaction was observed for 15 minutes, and then the temperature set point was raised to 70° C. using the temperature controller. The reaction was heated at 70° C. overnight and allowed to cool to room temperature.

MeFBSEA was made according to the method of U.S. Pat. No. 6,664,354 (Savu), Example 2, Parts A and B, incorporated herein by reference, except using 4270 kg of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in Part B.

Test for Foam Stability

A 1% by weight solution of Example 1 was prepared by dilution of the 41% solids solution in ethyl acetate with kerosene (obtained from Alfa Aesar, Ward Hill, Mass.) to make 188 mL of solution. The solution was placed in the bowl of a food mixer obtained from Hobart, Troy, Ohio (model N-50) equipped with a wire whisk stirrer, and the solution was stirred for 3 minutes at 300 rpm at room temperature (22° C.). The resulting foam was immediately transferred to a 2000 mL graduated cylinder made of "NALGENE" high density polypropylene and having a internal diameter of about 8 centimeters and a height of about 52 centimeters (obtained from VWR International). The volume of foam was measured in mL, and the foam expansion (i.e., the foam volume divided by 188) was recorded. The foam volume was observed over time, and the time at which 94 mL of liquid were present (i.e., the foam half-life) was recorded. The foam index (i.e., the product of the foam expansion and the foam half-life) was calculated. The foam half-life, foam volume, and foam index are reported in Table 1, below.

TABLE 1

|  | Fluorinated Monomer (g) | Non-fluorinated Monomer (g) | Foam Half Life, minutes | Foam volume, mL | Foam Index |
| --- | --- | --- | --- | --- | --- |
| Example 1 | MeFBSEA (50) | Octadecyl Methacrylate (50) | 55 | 1500 | 438 |
| Example 2 | MeFBSEA (250) | Stearyl Methacrylate (250) | 51.5 | 1450 | 389 |
| Example 3 | MeFBSEA (50) | Stearyl Acrylate (50) | 43 | 1450 | 331 |
| Example 4 | MeFBSEA (40) | Octadecyl Methacrylate (60) | 41 | 1550 | 337 |
| Example 5 | MeFBSEA (60) | Octadecyl Methacrylate (40) | 28.5 | 1300 | 197 |
| Example 6 | MeFBSEA (40) | Behenyl Methacrylate (60) | 40.5 | 1350 | 290 |
| Example 7 | MeFBSEA (50) | Behenyl Methacrylate (50) | 34.5 | 1150 | 211 |
| Illustrative Example 1 | MeFBSEMA (50) | Octadecyl Methacrylate (50) | 14.5 | 1100 | 85 |
| Illustrative Example 2 | MeFBSEMA (55) | Octadecyl Methacrylate (45) | 23.5 | 1300 | 162 |
| Illustrative Example 3 | MeFBSEMA (60) | Octadecyl Methacrylate (40) | 23 | 1360 | 166 |
| Illustrative Example 4 | MeFBSEMA (412) | Behenyl Methacrylate (275) | 30.5 | 1275 | 207 |
| Illustrative Example 5 | MeFBSEMA (40) | Octadecyl Methacrylate (60) | 2 | 960 | 10 |
| Illustrative Example 6 | MeFBSEA (60) | Decyl Methacrylate (40) | 13 | 1250 | 86 |
| Illustrative Example 7 | MeFBSEA (70) | Dodecyl Methacrylate (30) | 17.5 | 1350 | 125.7 |

TABLE 1-continued

|  | Fluorinated Monomer (g) | Non-fluorinated Monomer (g) | Foam Half Life, minutes | Foam volume, mL | Foam Index |
|---|---|---|---|---|---|
| Illustrative Example 8 | MeFBSEA (80) | Dodecyl Methacrylate (20) | not soluble[a] | not soluble[a] | not soluble[a] |
| Illustrative Example 9 | FBMA (60) | Octadecyl Methacrylate (40) | 12.5 | 2100 | 139.6 |
| Illustrative Example 10 | FBMA (50) | Hexadecyl Methacrylate (50) | 0.5 | 1050 | 2.75 |
| Illustrative Example 11 | FBMA (60) | Stearyl Acrylate (40) | 9 | 1600 | 76.5 |
| Illustrative Example 12 | MeFBSEA (250) | Octadecyl Methacrylate (250) | 13[b] | 1570[b] | 109[b] |
| Illustrative Example 13 | MeFBSEMA (77,000) | Stearyl Methacrylate (51,000) | 25 | 1380 | 183 |
| C.E.[c] A | FOMA (30) | Dodecyl Methacrylate (70) | 0.25 | 600 | 0.8 |
| C.E.[c] B | EtFOSEA (60) | Dodecyl Methacrylate (40) | 19 | 1500 | 152 |
| C.E.[c] C | NFA (10) | Dodecyl Methacrylate (6.7) | 0.25 | 500 | 0.66 |
| C.E.[c] D | NFA (10) | Dodecyl Methacrylate (30) | 0 | 500 | 0 |
| C.E.[c] E | NFMA (10) | Dodecyl Methacrylate (23) | 8.5 | 2250 | 102 |
| C.E.[c] F | NFMA (10) | Dodecyl Methacrylate (6.7) | 9 | 1400 | 67 |

[a]The polymer was not soluble in kerosene; therefore, it was not possible to prepare a foam.
[b]Average of two measurements.
[c]Comparative Example Example 2

Example 2 was prepared using the method of Example 1 except that 250 g of MeFBSEA, 250 g of stearyl methacrylate (obtained from Sigma-Aldrich, Milwaukee, Wis.), 1.0 g of thioglycerol, 10.0 g of a 50/50 mixture of mineral spirits/tert-butyl peroxy-2-ethylhexanoate ("LUPEROX 26M50") and 715 g of ethyl acetate were used. The weight average molecular weight was determined to be $1.28 \times 10^5$ grams per mole (and the number average molecular weight $6.8 \times 10^4$ grams per mole) using the test method described above. The test for foam stability was carried out as described in Example 1, and the results are reported in Table 1, above.

Examples 3-7 Illustrative Examples 1-11 and Comparative Examples A-B

Examples 3-7, Illustrative Examples 1-11, and Comparative Examples A-B were prepared and tested using the methods of Example 1 except using the monomers and amounts shown in Table 1, above.
Stearyl Acrylate was obtained from VWR International.
MeFBSEMA was made according to the method of U.S. Pat. No. 6,664,354 (Savu), Example 2, Parts A and B, incorporated herein by reference, except using 3420 kg of N-methylperfluorobutanesulfonamidoethanol, 1.6 kg of phenothiazine, 2.7 kg of methoxyhydroquinone, 1400 kg of heptane, 980 kg of methacrylic acid (instead of acrylic acid), 63 kg of methanesulfonic acid (instead of triflic acid), and 7590 kg of water in Part B.
Behenyl Methacrylate was obtained from Ciba Specialty Chemicals, Basel, Switzerland, under the trade designation "CIBA AGEFLEX FM22".
Decyl methacrylate and hexadecyl methacrylate were obtained from Monomer-Polymer & Dajac Labs, Feasterville, Pa.
Dodecyl methacrylate was obtained from Avocado Organics, Ward Hill, Mass. 2,2,3,3,4,4,4-Heptafluorobutyl 2-methylacrylate (FBMA) was prepared as described in paragraph 47 of EP1311637 (Savu et al.), published Apr. 5, 2006.
2,2,3,3,4,4,5,5,6,6,7,7,8,8,8-Pentadecafluorooctyl 2-methylacrylate (FOMA) was obtained from 3M Company, St. Paul, Minn., under the designation "L-9179".
N-Ethylperfluorooctanesulfonamidoethyl acrylate (EtFOSEA) was obtained from 3M Company under the trade designation "FX-13".
The results from the foam testing of Examples 3-7, Illustrative Examples 1-11, and Comparative Examples A-B are given in Table 1, above.

Illustrative Example 12

Illustrative Example 12 was prepared and tested using the methods of Example 3, except the polymerization was carried out in hexane. The weight average molecular weight of the resulting polymer was determined to be $8.9\times10^4$ grams per mole (and the number average molecular weight $5.7\times10^4$ grams per mole) using the test method described above. The foam characteristics are provided in Table 1, above.

Illustrative Example 13

Under vacuum (300 mmHg ($4\times10^4$ Pa)), 340 pounds (154 kilograms (kg)) of a 50% solution of N-methylperfluorobutanesulfonamidoethyl methacrylate (MeFBSEMA) in ethyl acetate was added to a 75-gallon (284-liter) stainless steel reactor with a jacket temperature set to 70° F. (21° C.), and the solution was stirred at 80 rpm. The vacuum was restored, and 113 pounds (51 kg) of stearyl methacrylate (obtained from Rohm & Haas, Philadelphia, Pa.) was added to the reactor. The vacuum was restored, and a pre-mixed solution of 276 grams (g) of thioglycerol (obtained from Evans Chemetics, Iselin, N.J.) and 2 pounds (0.9 kg) of ethyl acetate were added to the reactor followed by 229 pounds (104 kg) of ethyl acetate. The reactor was placed under nitrogen pressure (50 psi ($3.4\times10^5$ Pa)), and the reactor jacket temperature was raised to 149° F. (65° C.). With continued stirring at 80 rpm, a pre-mixed solution of 5.7 pounds (2.6 kg) of a 50/50 mixture of mineral spirits/tert-butyl peroxy-2-ethylhexanoate ("LUPEROX 26M50") and 4 pounds (1.8 kg) of ethyl acetate was added. The reaction mixture was stirred and heated at 149° F. (65° C.) for about 27 hours, allowed to cool to about 90° F. (32° C.), and drained into two 55-gallon (208-liter) drums and one 5-gallon (19-liter) pail. The weight of the resulting product solution was 645 pounds (292 kg). A sample was heated for 1 hour and 105° C., conditions under which the monomers and solvents were completely volatile, and was determined to be 41% solids. The weight average molecular weight was determined to be $1.36\times10^5$ grams per mole (and the number average molecular weight $4.0\times10^4$ grams per mole) using the test method described above.

Comparative Example C

Under a flow of nitrogen, 10 g of 3,3,4,4,5,5,6,6,6-nonafluorohexyl acrylate (NFA) (obtained from Daikin Chemical Sales, Osaka, Japan), 6.7 g of dodecyl methacrylate (obtained from Avocado Organics), 0.03 g of thioglycerol, and 33 g of ethyl acetate were added to a 1-L flask equipped with an overhead stirrer, a thermocouple, and a reflux condenser. After the additions, the contents of the flask were kept under slightly positive nitrogen pressure. The temperature set point was raised to 65° C. using a J-Kem temperature controller (obtained from VWR International), and 0.33 g of a 50/50 mixture of mineral spirits/tert-butyl peroxy-2-ethylhexanoate ("LUPEROX 26M50") was added. The reaction was observed for 15 minutes, and then the temperature set point was raised to 70° C. using the temperature controller. The reaction was heated at 70° C. overnight and allowed to cool to room temperature. The test for foam stability was carried out as described in Example 1, and the results are reported in Table 1, above.

Comparative Examples D-F

Comparative Examples D-F were prepared and tested using the methods of Comparative Example C, except using the monomers and amounts shown in Table 1, above. 3,3,4,4,5,5,6,6,6-Nonafluorohexyl 2-methylacrylate (NFMA) was obtained from Indofine Chemical Co., Hillsborough, N.J.

Comparative Example G

Under a flow of nitrogen, 840 g of MeFBSEMA, 560 g of stearyl methacrylate (obtained from Sigma-Aldrich), 14.0 g of thioglycerol, and 2000 g of ethyl acetate were added to a 5-L flask equipped with an overhead stirrer, a thermocouple, and a reflux condenser. After the additions, the contents of the flask were kept under slightly positive nitrogen pressure. The temperature set point was raised to 73° C. using a J-Kem temperature controller (obtained from VWR International), and 84 g of a 50/50 mixture of mineral spirits/tert-butyl peroxy-2-ethylhexanoate ("LUPEROX 26M50") was added. The reaction was observed for 15 minutes, and then the temperature set point was raised to 78° C. using the temperature controller. The reaction was heated at 78° C. for 6 hours and 20 minutes and allowed to cool to room temperature. The weight average molecular weight of the resulting polymer was determined to be $1.5\times10^4$ grams per mole (and the number average molecular weight $9.1\times10^3$ grams per mole) using the test method described above except 125 mg of sample were dissolved in tetrahydrofuran, the column was at room temperature, an evaporative light scattering detector (obtained from Polymer Laboratories) was used, and the molecular weight calibration was performed using narrow dispersity polystyrene standards with peak average molecular weights ranging from $1.1\times10^6$ grams per mole to 168 grams per mole. The test for foam stability was carried out as described in Example 1. The foam volume was 1120 mL, the foam half-life was 8.5 minutes, and the foam index was 51.

Comparative Example H

A 1% by weight solution of a nonionic polymeric surfactant comprising fluorinated repeating units having 8 perfluorinated carbon atoms (obtained from 3M Company, St. Paul, Minn., as a 50% solution under the trade designation "FC-740") was prepared and foamed according to the method of Example 1. The foam volume was 1660 mL, the foam half-life was 32 minutes, and the foam index was 282.

Comparative Example I

Comparative Example I was prepared using the method of Example 2, except that 60 g of MeFBSEMA, 20 g of octadecyl methacrylate, and 20 g of an acrylate monomer prepared from a methoxy-terminated polyethylene oxide alcohol, obtained from Union Carbide, Danbury, Conn. under the trade designation "CARBOWAX 750", using the procedure described in Example 17 of U.S. Pat. No. 3,728,151 (Sherman et al.), the disclosure of which is incorporated herein by reference. The polymer was not soluble in kerosene; therefore, it was not possible to prepare a foam.

Comparative Example J

Comparative Example J was prepared and tested using the methods of Example 2 except that 55 g of MeFBSEMA, 40 g of octadecyl methacrylate, and 5 g of acrylic acid (obtained from Sigma-Aldrich) were used in the preparation. The test for foam stability was carried out as described in Example 1. The foam volume was 1240 mL, the foam half-life was 4.5 minutes, and the foam index was 29.9.

Examples 8 to 11

Examples 8 to 11 were prepared and tested according to the method of Example 1 except using the monomers and amounts shown in Table 2, below, and adding an additional 122 g of ethyl acetate at the end of the reaction time before cooling to room temperature. The results from the foam testing of Examples 8 to 11 are given in Table 2, below.

TABLE 2

| | Fluorinated Monomer (g) | Non-fluorinated Monomer (g) | Non-fluorinated Monomer (g) | Foam Half Life, minutes | Foam volume, mL | Foam Index |
|---|---|---|---|---|---|---|
| Example 8 | MeFBSEA (50) | Stearyl Methacrylate (40) | Behenyl Methacrylate (10) | 15 | 1360 | 115 |
| Example 9 | MeFBSEA (56) | Stearyl Methacrylate (22) | Behenyl Methacrylate (22) | 33 | 1500 | 263 |
| Example 10 | MeFBSEA (50) | Stearyl Methacrylate (25) | Behenyl Methacrylate (25) | 37 | 1500 | 295 |
| Example 11 | MeFBSEA (50) | Stearyl Methacrylate (10) | Behenyl Methacrylate (40) | 50 | 1500 | 402 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A nonionic fluorinated polymeric surfactant having a weight average molecular weight of least 100,000 grams per mole, the nonionic fluorinated polymeric surfactant comprising:
   divalent units independently represented by formula I:

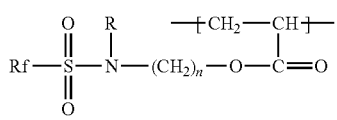

in a range from 30% to 65% by weight, based on the total weight of the nonionic fluorinated polymeric surfactant; and
   divalent units independently represented by formula II:

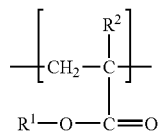

in a range from 70% to 35% by weight, based on the total weight of the nonionic fluorinated polymeric surfactant;
   wherein
   $R_f$ is a perfluoroalkyl group having from 3 to 4 carbon atoms;
   R and $R^2$ are each independently hydrogen or alkyl of 1 to 4 carbon atoms;
   $R^1$ is alkyl of 16 to 24 carbon atoms; and
   n is an integer from 2 to 11.

2. The nonionic fluorinated polymeric surfactant of claim 1, wherein divalent units represented by formula I are present in a range from 45% to 55% by weight, based on the total weight of the nonionic fluorinated polymeric surfactant.

3. The nonionic fluorinated polymeric surfactant of claim 1, wherein $R^1$ is alkyl of 18 to 22 carbon atoms.

4. A composition comprising the nonionic fluorinated polymeric surfactant of claim 1 and a liquid hydrocarbon.

5. The composition of claim 4 wherein the liquid hydrocarbon comprises at least one of kerosene, diesel, gasoline, pentane, hexane, heptane, mineral oil, or a naphthene.

6. The composition of claim 4, wherein the nonionic fluorinated polymeric surfactant is present in a range from 0.1 percent to 5 percent by weight, based on total weight of the composition.

7. The composition of claim 4, wherein the composition is a foam.

8. The composition of claim 7, wherein a one weight percent solution of the nonionic fluorinated polymeric surfactant in kerosene has a foam half-life at 25° C. of at least 30 minutes.

9. The composition of claim 7, further comprising a plurality of proppant particles.

10. The composition of claim 7, further comprising at least one gelling agent.

11. A method of making a foam comprising a liquid hydrocarbon, the method comprising:
    providing a composition comprising the liquid hydrocarbon and a nonionic fluorinated polymeric surfactant having a weight average molecular weight of least 100,000 grams per mole, the nonionic fluorinated polymeric surfactant comprising:
    divalent units independently represented by formula I:

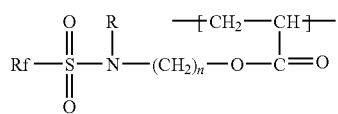

in a range from 30% to 65% by weight, based on the total weight of the nonionic fluorinated polymeric surfactant; and
    divalent units independently represented by formula II:

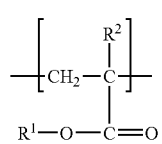

in a range from 70% to 35% by weight, based on the total weight of the nonionic fluorinated polymeric surfactant;

wherein
- $R_f$ is a perfluoroalkyl group having from 3 to 4 carbon atoms;
- R and $R^2$ are each independently hydrogen or alkyl of 1 to 4 carbon atoms;
- $R^1$ is alkyl of 16 to 24 carbon atoms; and
- n is an integer from 2 to 11; and forming gas bubbles in the composition to make the foam.

12. A method of treating a subterranean geological formation bearing hydrocarbons, the method comprising:
introducing a foam into the subterranean geological formation bearing hydrocarbons, wherein the foam comprises a liquid hydrocarbon and the nonionic fluorinated polymeric surfactant according to claim 1.

13. The method of claim 12, wherein introducing the foam comprises injecting the foam into the subterranean geological formation bearing hydrocarbons at a rate and pressure sufficient to open at least one fracture therein.

14. The method of claim 13, further comprising injecting a plurality of proppant particles into the fracture.

15. A method of claim 12, wherein the formation has at least one injection well and at least one production well, and wherein introducing the foam into the subterranean geological formation bearing hydrocarbons comprises injecting the foam through the injection well, the method further comprising:
causing the foam to mobilize at least a portion of the hydrocarbons in the subterranean geological formation.

16. The method of claim 15, further comprising recovering at least a portion of the hydrocarbons from the production well.

17. The method of claim 12, further comprising:
drilling a well in the subterranean geological formation bearing hydrocarbons using a drilling rig; and
transporting drilling cuttings via the foam.

18. The method of claim 12, wherein the subterranean geological formation is penetrated by a well bore, and wherein the foam is introduced into the well bore of the subterranean geological formation, the method further comprising:
carrying out a completion operation in the well bore of the subterranean geological formation.

19. The method of claim 18, wherein the completion operation is at least one of gravel packing the well bore, cleaning the well bore, or cementing the well bore.

20. The method of claim 12, wherein the liquid hydrocarbon is at least one of kerosene, diesel, gasoline, pentane, hexane, heptane, mineral oil, or a naphthene.

\* \* \* \* \*